(12) United States Patent
Kinsey et al.

(10) Patent No.: US 12,050,781 B2
(45) Date of Patent: Jul. 30, 2024

(54) DISTRIBUTED DATA STORAGE SYSTEM WITH BOTTLENECK MITIGATION

(71) Applicant: Seagate Technology LLC, Fremont, CA (US)

(72) Inventors: Jason Wayne Kinsey, Longmont, CO (US); Hemant Vitthalrao Mane, Pune (IN); Niranjan Anant Pol, Pune (IN); Marc Timothy Jones, Longmont, CO (US); Jason Matthew Feist, Minneapolis, MN (US)

(73) Assignee: Seagate Technology LLC, Fremont, CA (US)

( * ) Notice: Subject to any disclaimer, the term of this patent is extended or adjusted under 35 U.S.C. 154(b) by 71 days.

(21) Appl. No.: 17/991,049

(22) Filed: Nov. 21, 2022

(65) Prior Publication Data

US 2023/0161483 A1 May 25, 2023

Related U.S. Application Data

(60) Provisional application No. 63/282,877, filed on Nov. 24, 2021.

(51) Int. Cl.
*G06F 3/06* (2006.01)
*G06F 11/10* (2006.01)

(52) U.S. Cl.
CPC .......... *G06F 3/0619* (2013.01); *G06F 3/0613* (2013.01); *G06F 3/0635* (2013.01); *G06F 3/067* (2013.01); *G06F 11/1076* (2013.01)

(58) Field of Classification Search
CPC .. G06F 3/0619; G06F 11/1076; G06F 3/0613; G06F 3/0635; G06F 3/067
See application file for complete search history.

(56) References Cited

U.S. PATENT DOCUMENTS

| | | | |
|---|---|---|---|
| 7,777,748 B2 | 8/2010 | Bakalash et al. | |
| 8,255,644 B2 | 8/2012 | Sonnier et al. | |
| 9,130,864 B2 | 9/2015 | Keith | |
| 9,210,100 B2 | 12/2015 | Van Der Linden et al. | |
| 10,387,332 B1 | 8/2019 | Metcalf et al. | |
| 10,628,236 B2 | 4/2020 | Liu et al. | |
| 10,834,000 B2 | 11/2020 | Dhanabalan | |
| 10,873,533 B1 | 12/2020 | Ismailsheriff et al. | |
| 10,885,951 B2 | 1/2021 | Sity et al. | |
| 10,976,935 B1* | 4/2021 | McCarthy | G06F 3/0614 |
| 10,987,332 B2 | 4/2021 | Gerber et al. | |
| 11,630,579 B2* | 4/2023 | Majerus | G06F 3/0634 711/103 |
| 2017/0302738 A1* | 10/2017 | Dimnaku | G06F 3/061 |

(Continued)

*Primary Examiner* — Guy J Lamarre
(74) *Attorney, Agent, or Firm* — Hall Estill Law Firm

(57) ABSTRACT

A data storage system employing distributed memories can have at least one host connected to a plurality of data storage devices via a network controller. One or more performance bottlenecks through the network controller may be identified with a performance module. A peer group consisting of at least two of the plurality of data storage devices is created with the performance module in response to the identified performance bottleneck so that a task can be assigned by the performance module to the peer group. The task may be chosen to mitigate the performance bottleneck by avoiding involvement of the network controller in the task.

20 Claims, 5 Drawing Sheets

(56) References Cited

U.S. PATENT DOCUMENTS

| | | | |
|---|---|---|---|
| 2020/0042390 A1* | 2/2020 | Roberts | G06F 11/1092 |
| 2020/0394075 A1* | 12/2020 | Dutta | G06F 9/5083 |
| 2022/0103436 A1* | 3/2022 | Wright | H04L 41/50 |
| 2022/0342556 A1* | 10/2022 | Dimnaku | G06F 3/067 |
| 2023/0251797 A1* | 8/2023 | Kannan | G06F 3/061 |
| | | | 711/167 |
| 2023/0418685 A1* | 12/2023 | Kinsey | G06F 9/5083 |
| 2024/0053993 A1* | 2/2024 | Mane | G06F 9/4451 |

\* cited by examiner

DISTRIBUTED DATA STORAGE SYSTEM WITH BOTTLENECK MITIGATION

RELATED APPLICATIONS

The present application makes a claim of domestic priority under 35 U.S.C. 119(e) to U.S. Provisional Patent Application No. 63/282,877 filed Nov. 24, 2021, the contents of which are hereby incorporated by reference.

SUMMARY

Various embodiments of the present disclosure are generally directed to mitigation of performance bottlenecks in data storage systems with distributed memory.

A data storage system, in some embodiments, connects at least one host to a plurality of data storage devices via a network controller. A performance module connected to the network controller identifies a performance bottleneck through the network controller and assigns a peer group of at least two of the plurality of data storage devices in response to the identified performance bottleneck. At least one task assigned by the performance module is executed with the at least two of the plurality of data storage devices with the task chosen to mitigate the performance bottleneck by avoiding involvement of the network controller in the task.

Other embodiments of a data storage system connect at least one host to a plurality of data storage devices via a network controller. A performance module connected to the network controller predicts a performance bottleneck through the network controller and assigns a peer group of at least two of the plurality of data storage devices in response to the predicted performance bottleneck. At least one task assigned by the performance module is executed with the at least two of the plurality of data storage devices chosen by the network controller as either a master device or a slave device. The assigned task is conducted by a controller of the master device and chosen by the performance module to prevent the predicted performance bottleneck by avoiding involvement of the network controller in the task.

Embodiments of a distributed data storage system connect at least one host to a plurality of data storage devices via a network controller before identifying a performance bottleneck through the network controller with a performance module connected to the network controller. The performance module assigns a first peer group of at least two of the plurality of data storage devices and a second peer group of at least two of the plurality of data storage devices in response to the identified performance bottleneck. The performance module then assigns a first task to the first peer group and a second task to the second peer group with each task chosen to alter the performance bottleneck by removing activity previously assigned to the network controller.

These and other features which may characterize various embodiments can be understood in view of the following detailed discussion and the accompanying drawings.

DETAILED DESCRIPTION

Assorted embodiments of a data storage system utilizing distributed memory are generally directed to preventing or mitigating performance bottlenecks by intelligently assigning downstream data storage devices to carry out tasks instead of an upstream network controller.

The proliferation of data generation, transfer, and storage has spurned expansive data repositories. For increased reliability and ease of maintenance, data repositories can employ memories of multiple different data storage devices to provide rather large capacity. Such distribution of data into separate data storage devices can be utilized to provide multiple concurrent data storage, security, and maintenance operations that result in seamless data storage and retrieval to any number of connected hosts. However, the centralized processing and/or transmission of data access requests in some distributed data storage systems can be plagued by inefficiencies, particularly in high volume conditions, that degrade system performance below the capabilities of the constituent data storage devices.

Some inefficiencies of a distributed data storage systems can be characterized, generally, as bottlenecks where performance degradation is exacerbated as system activity volume increases. Through the prediction and/or identification of performance bottlenecks in a distributed data storage, various system activity can be assigned to downstream data storage devices for execution instead of centralized network components that are susceptible to dynamic activity volume performance degradation. The intelligent handling of detected, or predicted, performance bottlenecks in a distributed data storage system can involve moving centralized system activity for execution by a peer group of data storage device that maintains consistent workloads for the centralized system components that equates to maximum performance potential realization.

Figure 1:
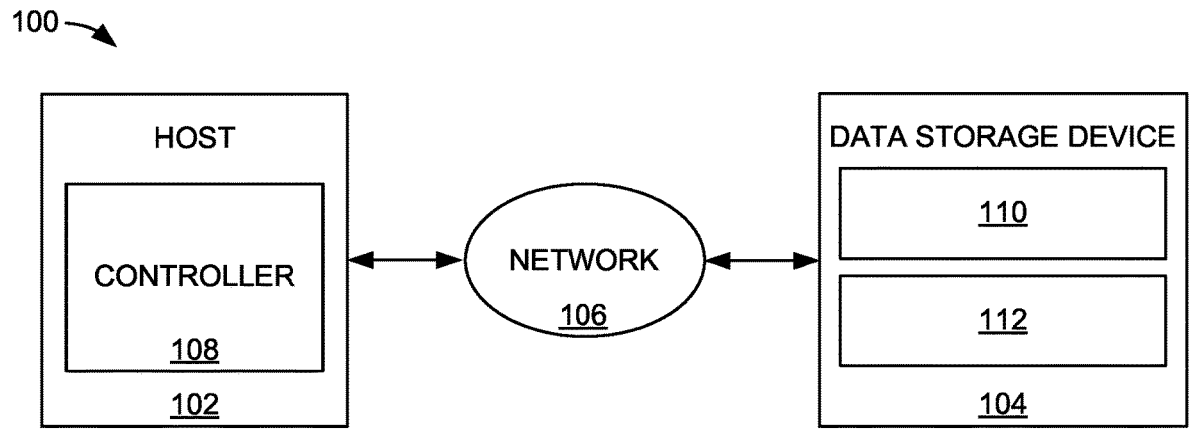
FIG. 1 depicts a block representation of an example data storage system in which various embodiments can be practiced.

An example distributed data storage system 100 is displayed as a block representation in FIG. 1. The data storage system 100 is arranged in a manner that various embodiments of the present disclosure can be practiced. Any number of hosts 102 can be connected to any number of data storage devices 104 via one or more wired and/or wireless networks 106. While a host 102 can be any component that generates, or receives, data, it is contemplated a host 102 has a local controller 108 that manages host 102 operation, maintains a connection with the system 100, and generates data access requests to store, or retrieve, data in one or more memories 110 of the respective data storage devices 104.

Similarly, a data storage device 104 is not limited to a particular component, but is contemplated to comprise a local data storage controller 112 that maintains data in at least one memory 110 and satisfies data access requests from one or more hosts 102. For example, a data storage device 104 can employ a microprocessor and/or other programmable circuitry Some embodiments allow direct submittal of data access requests to data storage devices 104, but such arrangement can be riddled with errors and latency, particularly when data, metadata, and/or data maps are stored in different memories 110.

Figure 2:
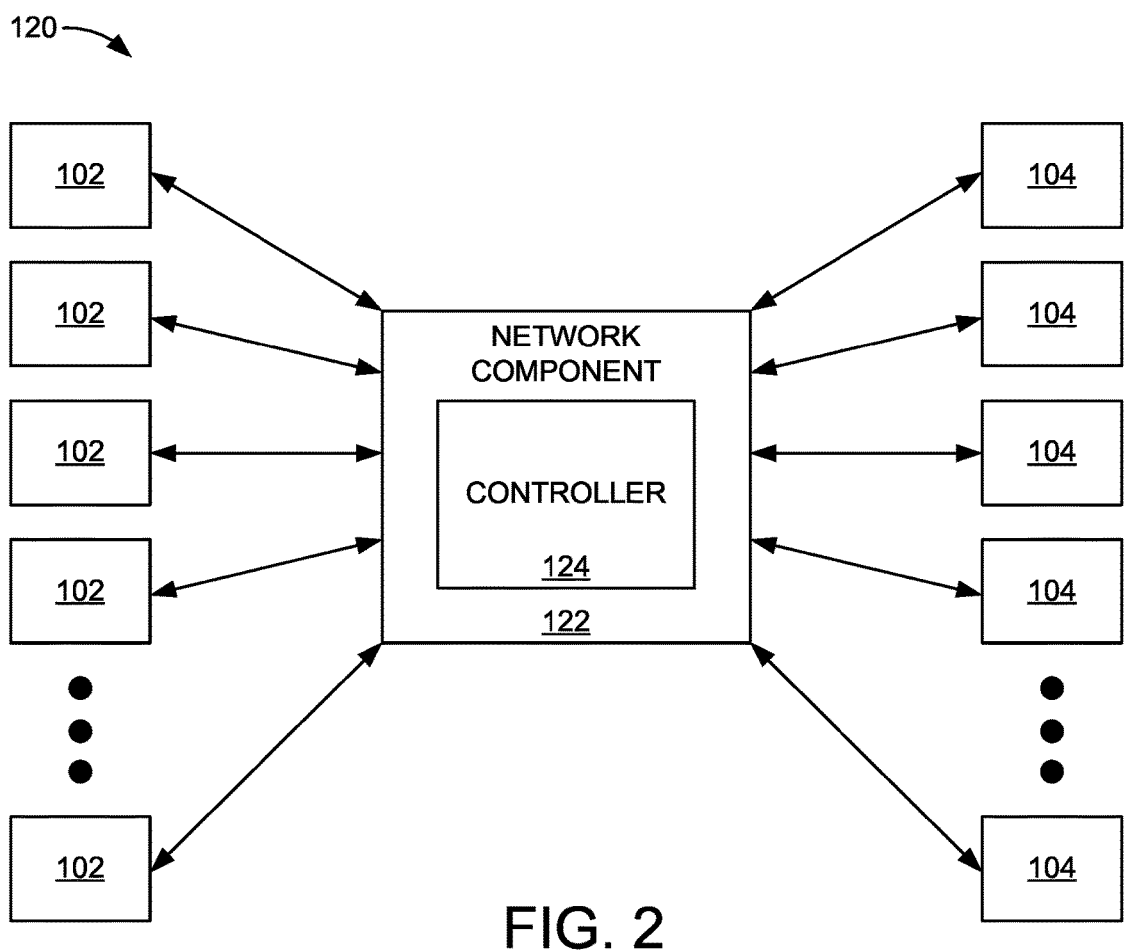
FIG. 2 depicts a block representation of portions of an example data storage system arranged in accordance with some embodiments.

FIG. 2 depicts a block representation of portions of an example data storage system 120 in which a centralized network component 122 schedules and conducts assorted operations between various hosts 102 and data storage devices 104. While it is contemplated that multiple separate components can concurrently, sequentially, or individually handle, control, and process activity between the respective hosts 102 and data storage devices 104, various embodiments employ a single network component 122 to process, schedule, and transfer data access requests to the data storage devices 104 as well as route data from one or more devices 104 to a requesting host 102.

Embodiments of a system 120 utilizing a single network component 122 can further schedule activity not associated with a host request, such as initialization of newly connected devices, maintenance of memory, background data operations, security updates, and firmware upgrades. As a non-limiting example, the network component 122 may employ a centralized controller 124 to carry out redundant array of independent devices (RAID) processing that mirror data, stripe data, and/or generate parity data among selected data destinations. The network controller 124 can execute various error correction code generation and/or utilization to rebuild data suffering an error/failure. The centralized network controller 124 can conduct device initialization that involves, for example, loading of boot information, such as tables, codes, certificates, maps, and firmware. It is contemplated that the network controller 124 executes firmware upgrades and/or alterations.

Assorted security protocol and aspects can be generated, assigned, and/or carried out by the network controller 124. For instance, the controller 124 can conduct cryptographic operations on data, create passwords, and/or verify certificates of various devices 104, hosts 102, and data. The responsibilities of the network component 122 can allow the downstream devices 104 to efficiently carry out the tasks assigned by the upstream network component 122, such as storing or retrieving data to satisfy a host 102 request, conducting garbage collection background operations, or moving data to a different memory.

However, the capability to conduct such robust and diverse varieties of responsibilities can be workload dependent. That is, the network controller 124 can operate at peak performance and/or efficiency when workloads are below a threshold volume and with degraded performance above the threshold value. As an example, the network controller 124 can process requests, generate tasks to be completed by downstream devices 104, and transfer data with maximum potential performance, such as error rate, latency, and pending queue size, while the volume of host-generated requests and data from downstream devices 104 is below a threshold volume. Once the workload of the network controller 124 exceeds the threshold, such as when pending activity volume and/or processing demands of active activities dynamically change, the controller 124 can suffer from degraded performance, such as increased latency and/or error rate. Hence, the centralized network component 122 can be considered a performance bottleneck in certain conditions.

It is noted that the addition of extra centralized processing components can mitigate performance degradation during some workload conditions. Yet, the incorporation of additional centralized components, such as in a server, node, controller, processor, or other intelligent circuitry, can add complexity and degrade reliability as the number of connected hosts 102 and/or volume of system activity increases. Accordingly, various embodiments are directed to intelligently identifying/predicting the occurrence of performance bottlenecks in centralized network components 122 and subsequently assigning one or more tasks previously assigned to the network components 122 to downstream data storage devices 104. In other words, the system can respond to dynamic workloads and bottlenecks in the centralized network components by moving tasks to downstream data storage devices 104 for execution.

Figure 3:
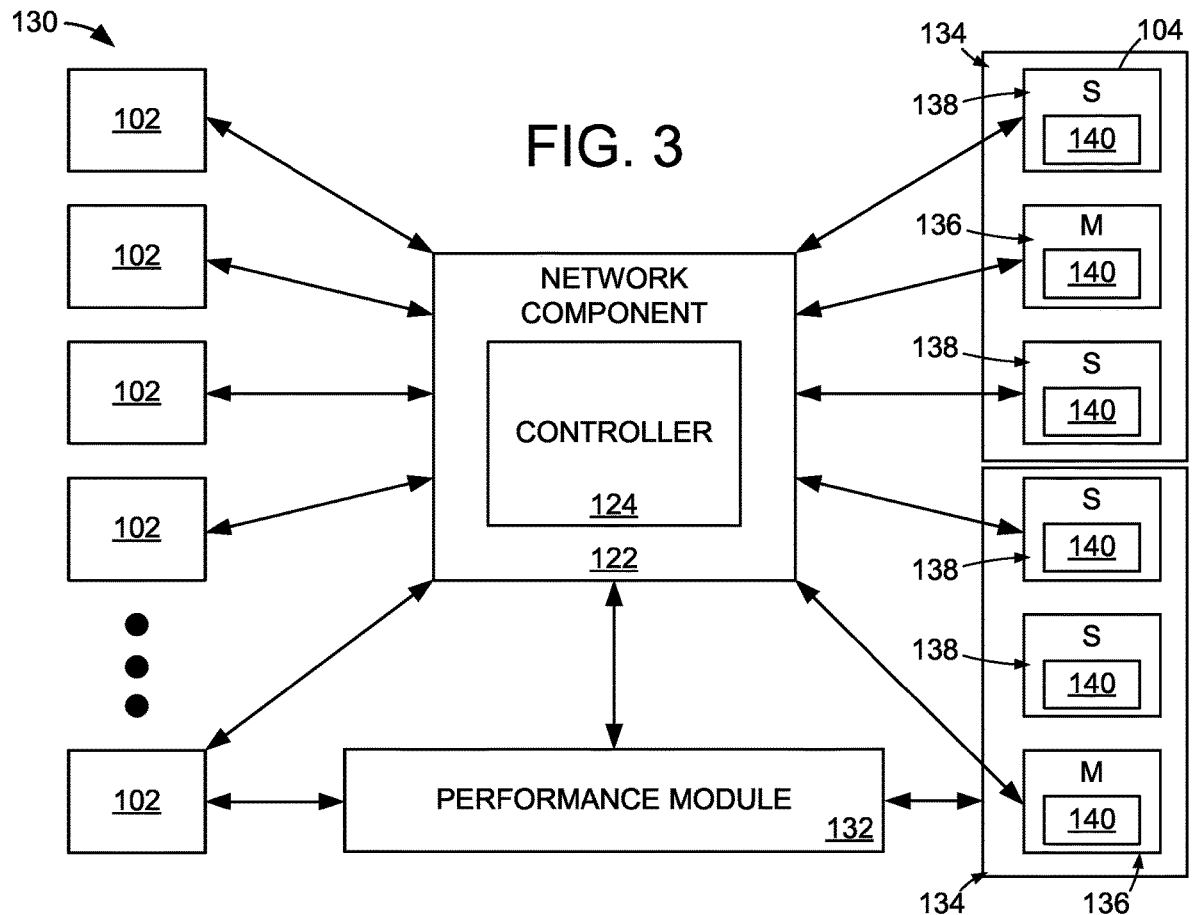
FIG. 3 depicts a block representation of portions of an example data storage system configured and operated in accordance with assorted embodiments.

FIG. 3 depicts a block representation of an example data storage system 130 configured to carry out various embodiments to optimize dynamic network workloads. A performance module 132 is connected to assorted aspects of the system 130 and operates to translate operational conditions to performance bottlenecks and deviations of tasks from upstream network components 122 to downstream data storage devices 104 to prevent or mitigate degradation to system 130 performance. The module 134 correlates logged system 130 activity and/or model data to identify/predict current and future workloads to the central network components 122 as well as future tasks that can be deviated to the data storage devices 104 for execution to decrease the workload and/or performance degradation risk to the centralized network component 122.

In addition to the deviation of task(s) from the network component 122 to downstream data storage devices 104, the performance module 132 can prescribe peer device groups 134 and master-slave relationships for the execution and satisfaction of the assigned tasks. In the non-limiting example shown in FIG. 3, the performance module 132 assigns a first task, such as satisfaction of a data access request, background data maintenance operation, error correction code assignment, or security protocol execution, to a first peer group 134 with a master device 136 (M) directing execution of the assigned task and one or more slave devices 138 (S) conducting commands generated by the master device 136 to complete the assigned task. That is, the peer group 134 has a master device 136 that generates and assigns commands with a local device controller 140 that is carried out by a controller 140 of a slave device 138.

For clarity, the assignment of a master 136 and slave devices 138 in a peer group 134 allows for local adaptation to changing operating conditions to carry out the assigned task from the network component 122 while satisfying normal data access and memory maintenance operations. For instance, the master device 136 assigned by the performance module 132 to carry out the task diverted from the network component 122 can utilize the local device controller 140 to generate, schedule, and assign sub-tasks to slave device(s) 138 to efficiently execute and complete the assigned task without degrading the ability to complete non-task activity, such as data access requests, background memory operations, and data maintenance. A slave device 138, in some embodiments, carries out tasks and sub-tasks assigned by a master device 136 without issuing any subsequent, or consequential, activity to any other devices. A slave device 138 can, however, communicate with other devices 138/140 of a peer group 136 to allow efficient scheduling, monitoring, and error handling.

As shown, the creation of multiple separate logical peer groups 134 allows separate master devices 136 to control and direct satisfaction of the respective assigned tasks with the assistance of slave devices 140 as commanded by the master device 136. In other words, separate peer groups 134 can conduct concurrent and/or sequential execution of different tasks respectively diverted from the upstream network component 122. The utilization of local device controllers 140 to intelligently prescribe commands to be carried out by slave devices 138 to accomplish the assigned tasks allows for maintenance of data storage device 104 capabilities for satisfaction of non-task related activity prescribed by the upstream components 122, such as data writes, data reads, and data relocation.

It is contemplated that the respective peer groups 134 are dynamic and can change over time to accommodate changing operating conditions. For instance, a peer group 134 can increase in size, change assigned task, or pause operation to allow other, non-task commands to be conducted by the constituent data storage devices 104. The performance module 132 can monitor and control the various aspects of the respective peer groups 134 over time. For instance, a decrease in workload for the upstream network components 122 can prompt the cancellation of a peer group 134 or the alteration of an assigned task while the originally assigned task is diverted back to the network component 122 for completion. As such, the logical peer groups 134 serve to increase efficiency of system tasks that could degrade network component capabilities if completed solely by the network component 122.

Figure 4:
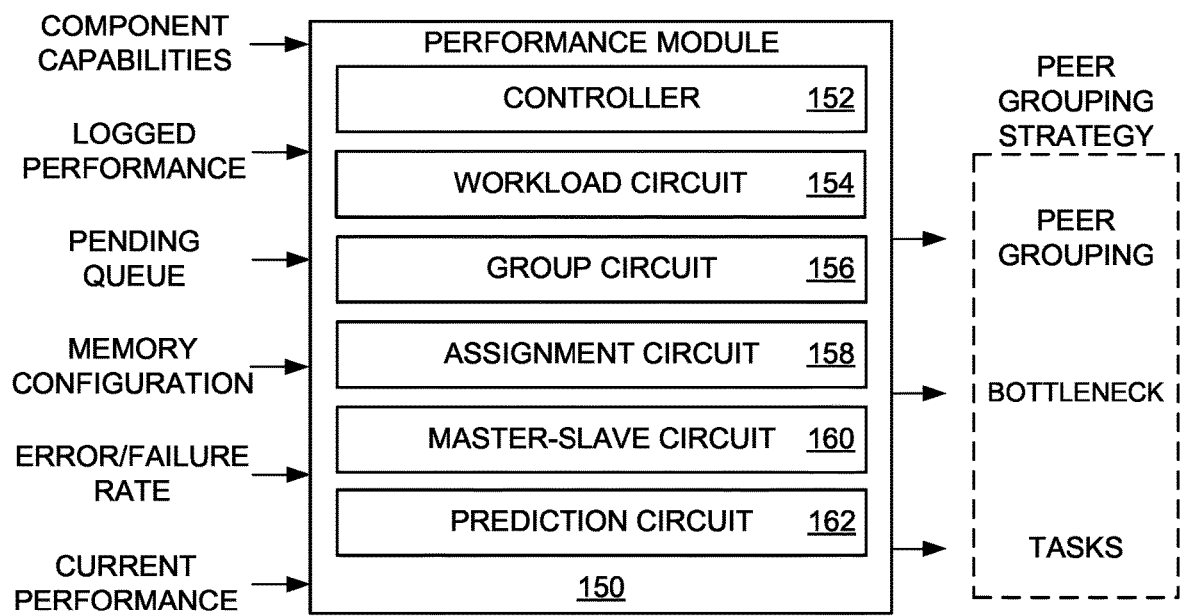
FIG. 4 depicts a block representation of an example performance module capable of being employed in the data storage system of FIG. 3.

FIG. 4 depicts a block representation of an example performance module 150 that can be employed in a distributed data storage system in accordance with various embodiments. The module 150 can be configured as hardware resident in any aspect of a data storage system. As an example, the module 150 can be circuitry of a printed circuit board located alone and connected to assorted components of the system 150 or positioned within a component of the system 150, such as a host 102, network component 122, or data storage device 104.

A performance module 150, in some embodiments, has a local controller 152 that processes input information, such as logged system activity, pending requests, system configurations, and component capabilities, to generate a peer grouping strategy that involves at least the prescription of certain tasks that normally would be completed by upstream network components to downstream data storage devices. The peer grouping strategy can have one or more operational thresholds that trigger deviation of one or more tasks to a group of one or more devices. It is contemplated that the peer grouping strategy prescribes particular data storage devices to be master devices that direct the completion of an assigned task and slave devices that simply execute commands from a master device without generating, scheduling, or controlling other devices of a peer group.

The local module controller 152 can operate alone, or in combination with other module circuitry, to generate, maintain, and execute a peer grouping strategy. Although not required or limiting, the module controller 152 can utilize a workload circuit 154 to identify a performance bottleneck that is occurring or imminent anywhere in a distributed data storage system. The workload circuit 154 can translate current operating conditions, such as error rate, latency, data throughput, metadata creation, and data mapping, into operational capabilities of upstream network components.

Such capabilities can be compared with scheduled system activity, such as memory maintenance operations, memory refresh, firmware upgrades, new device initialization, and background data operations, along with pending host-generated data access requests to determine if a strain on network component performance is likely. For example, detection of relatively high volumes of pending host-generated requests, scheduled memory/device operations, and/or processing intensive data accesses by the workload circuit 154 can be compared to performance capabilities of network components relative to historical and/or recent performance metrics, such as average error rate or average request satisfaction latency, to determine if the network component will experience lower than average performance, such as if capabilities are exceeded or likely to be met with currently assigned tasks.

The identification of network components nearing, or exceeding, operational capabilities to the detriment of average component performance metrics allows the performance module 150 to intelligently divert one or more tasks from upstream network components for execution by downstream data storage devices to reduce the workload on the network components and maintain an average performance of the distributed data storage system over time. While some embodiments simply utilize the computing capabilities of a downstream data storage device, such as a local controller, memory, and/or buffer, alone, other embodiments assign peer groups of downstream data storage devices to accomplish an assigned task diverted from the upstream network components. Such peer group can provide more robust capability to satisfy an assigned task without degrading downstream device performance, which creates a seamless transition of the task from network components to the downstream devices.

A group circuit 156 can operate to analyze and prescribe data storage device peer groupings that provide optimal task satisfaction without jeopardizing the average performance of the devices of a peer group. The group circuit 156 can continually, sporadically, or routinely evaluate the current performance of various data storage devices to determine what processing capabilities are available and what devices can operate in conjunction to provide optimal processing and completion of at least one assigned task. The group circuit 156 can assess any number and type of performance metrics, such as processing capacity, error rate, data access latency, type of data stored in the device, encryption protocol, and error correction protocol, along with scheduled device activities, such as background memory schedule, firmware upgrades, and data maintenance operations, to determine the capacity to complete a task diverted from an upstream network component.

Operation of the group circuit 156 can provide a combination of processing capabilities among multiple separate data storage devices to efficiently complete a diverted task without jeopardizing the average performance of the respective peer group devices, such as data access latency, error rate, and data rebuild time. For instance, the group circuit 156 combines complementary, but separate, data storage devices into a logical peer group to provide a diverse range of performance capabilities to give the highest chance of maintaining average data access request service times, such as different devices having different error rates, processing latency, processing peak speeds, and security protocol.

The ability to assess the capabilities of different data storage devices over time allows the group circuit 156 to provide dynamic logical peer groupings that evolve as conditions change to consistently provide an optimized combination of capabilities to satisfy an assigned task diverted from an upstream network component while satisfying normal, host-generated data access requests to the constituent memories of the peer group with average, or better, performance. It is noted that the group circuit 156 can concurrently assign, monitor, and maintain multiple different logical peer groups provides a diverse range of capabilities to satisfy multiple diverted tasks without jeopardizing or degrading the average data access performance of the constituent data storage devices.

The dynamic assignment and maintenance of logical peer groups allows a distributed data storage system to intelligently adapt to changing data access and component capabilities to alleviate high traffic and/or processing demands on a network component without sacrificing real-time data access performance. Much like how the group circuit 156 evaluates and optimizes logical peer groupings of data storage devices, an assignment circuit 158 can set what tasks are to be diverted from an upstream network component to a peer group. The assignment circuit 156 can assign, pause, and alter what tasks a peer group is assigned, which allows for intelligent utilization of storage device processing capabilities without degrading performance of host-generated data access requests.

The assignment circuit 158 can evaluate any number and type of current and predicted operational parameters to prescribe network component tasks, such as RAID operations, error correction code generation, data rebuilds, error recovery, security operations, firmware upgrades, and device initialization, to one or more logical peer groups set by the group circuit 156. As a non-limiting example, the assignment circuit 158 can determine the current and/or future workloads and processing capacity of upstream network components, individual data storage devices, and logical peer groups as a whole to assign the diversion of one or more tasks from network components to a logical peer group.

In some embodiments, the assignment circuit 158 prescribes a series of tasks to be completed by a single peer group, which minimizes delay and maximizes processing capability of a peer group. Other embodiments of the assignment circuit 158 prescribes redundant tasks to different peer groups and cancels a task upon completion of the task by another peer group. The assignment circuit 158, in response to a detected or predicted change in operating conditions and/or processing capabilities, can pause execution of a task by a single data storage device or by a peer group as a whole to allow the data storage devices to exclusively process and satisfy host-generated data access requests. The ability to pause and resume satisfaction of an assigned task relative to satisfaction of host-generated data access requests can ensure no degradation of performance for data storage devices despite additional processing associated with a diverted network component task.

It is contemplated that the assignment circuit 158 alters and/or moves a task to be completed. For instance, an initially prescribed task can be changed to a different task or moved to a different peer group for completion in response to changes in operational conditions, such as processing capabilities, error rate, and data access latency. The dynamic assignment of peer groups and tasks to be completed by a group can be complemented by a dynamic control scheme established and maintained by a master-slave circuit 160. That is, the master-slave circuit 160 can assign data storage devices as either master devices that issue commands to satisfy a task or slave devices that execute issued commands without generating additional commands. The assignment and maintenance of which devices of a peer group are master devices and which devices are slave devices provides an additional layer of optimized assignments that allow for concurrent execution of host-generated data access requests and diverted network component tasks without degrading average performance metrics.

A prediction circuit 162 can input assorted current and past system operations, actions, and activity, along with model data from other memory, to forecast at least one future operational condition, data access request, or data access performance. The accurate prediction of memory, metadata, and network conditions along with data access performance allows the respective assignment of peer groups, tasks, and master/slave roles to mitigate, or completely avoid, a current, or predicted future, performance bottleneck in a network component.

The prediction circuit 162 can further forecast how long different assignments will balance processing capabilities of the data storage system with performance. That is, the prediction circuit 162 can estimate assorted different peer group, task, and master/slave assignments to determine which assignments to alter to provide optimal balance of the utilization of excess processing capabilities and risk of degrading performance of satisfying host-generated data access requests. The evaluation of multiple different assignments prescribed by other circuitry of the module 150 allows the module 150 to quickly adjust between different assignments to provide a practical workload control and maintain operational performance without unduly stalling or degrading overall data storage system performance.

The prediction circuit 162 can detect and/or poll a diverse variety of information pertaining to current, and past, data storage operations as well as environmental conditions during such operations. Although not exhaustive, the prediction circuit 162 can receive information about the current status of a write queue, such as the volume and size of the respective pending write requests in the queue. The prediction circuit 162 may also poll, or determine, any number of system/device performance metrics, like write latency, read latency, and error rate. The version of data pending, or being written, may be evaluated by the prediction circuit 162 to establish how frequently data is being updated.

Figure 5:
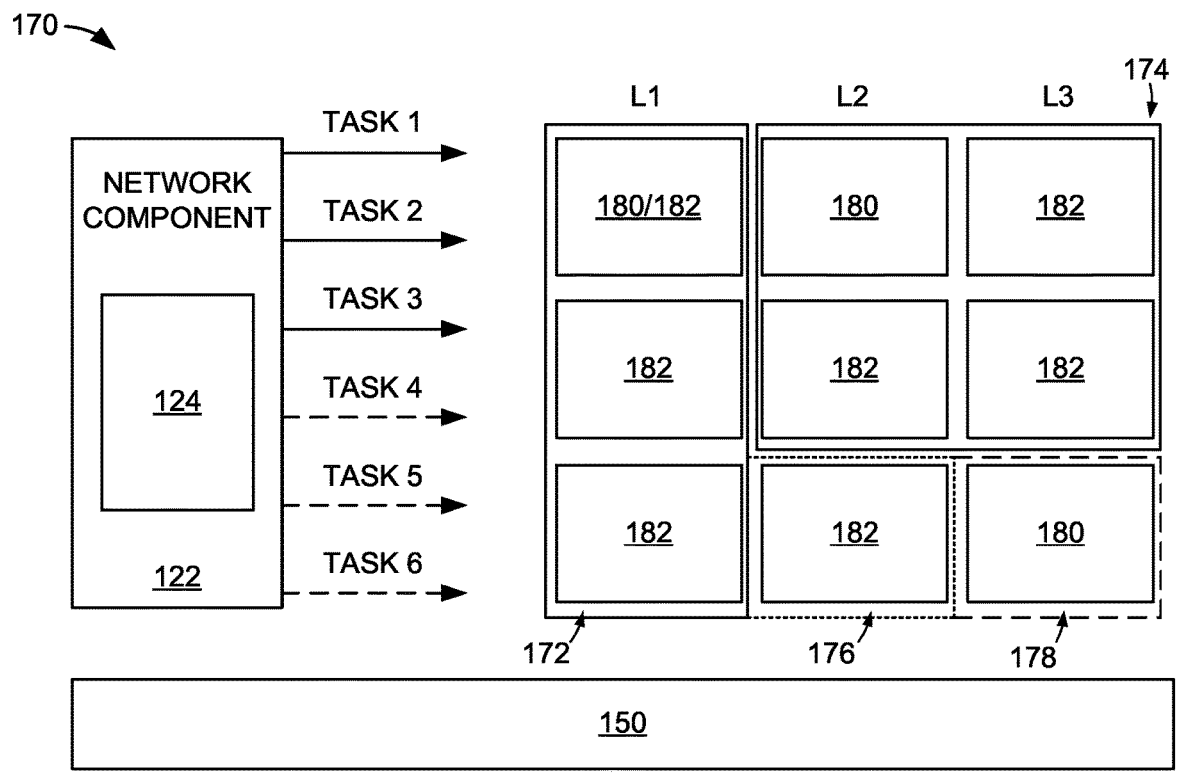
FIG. 5 depicts a block representation of portions of an example data storage system utilized in accordance with various embodiments.

FIG. 5 depicts a block representation of portions of an example distributed data storage system 170 in which a performance module 150 can be utilized to conduct assorted embodiments that optimize downstream data storage devices 104 to complete one or more tasks diverted from upstream network component(s) 122. The network component 122 can process and complete any number of tasks, as shown by solid arrows, while the performance module 150 diverts one or more tasks, as shown by segmented arrows, to at least one logical peer group of data storage devices.

The non-limiting peer group configuration displayed in FIG. 5 has a number of data storage device 104 located in different physical locations (L1/L2/L3), such as different cities, countries, or continents, that are logically clustered into peer groups 172 and 174. It is noted that a logical group 172/174 can consist of similar or dissimilar data storage devices 104 that are aggregated by the performance module 150 to complete one or more tasks diverted from the network component 122. The respective groups 172/174 may, but are not required, to have master (M) and slave (S) designations prescribed by the performance module 150, which correspond with which data storage device 104 generates commands to complete an assigned task and which device simply executes commands without generating new commands.

It is noted that not all available data storage devices 104 are assigned to peer groups. The availability of non-assigned devices 104 allows the performance module 150 to selectively add to existing logical peer groups in response to changing operational conditions. That is, the performance module 150 can add devices 104 not previously incorporated into a logical peer group to provide additional processing and/or data storage capabilities to optimize the concurrent execution of a diverted task along with satisfaction of host-generated data access requests while maintaining average data access request performance, such as request latency and error rate.

The addition of data storage devices 104 to a peer group may correspond with an alteration of the master/slave assignments. The non-limiting example shown in FIG. 5 illustrates how the first peer group 172 can expand, initially, to a second size 176 without altering the master/slave assignments and, subsequently, to a third size 178 that corresponds with a new master device 180 and a demotion of the initial master device to a slave device 182. The new master device 180 can be selected for any reason, but some embodiments reserve a data storage device with low average processing load to fill in for a peer group that is experiencing elevated volumes of host-generated data access requests during satisfaction of a task deviated from the upstream network component 122.

The dynamic adaptations of peer group size and/or master/slave assignments is not required for each group 172/174 of a system. As shown, the second peer group 174 can remain in an original configuration during the alteration of the first peer group 172. Hence, the performance module 150 can make adaptive modifications to less than all the peer groups of a system 170, which can optimize the balance of available device processing capabilities with the ability to satisfy host-generated data access requests with at least historical average performance metrics.

Figure 6:
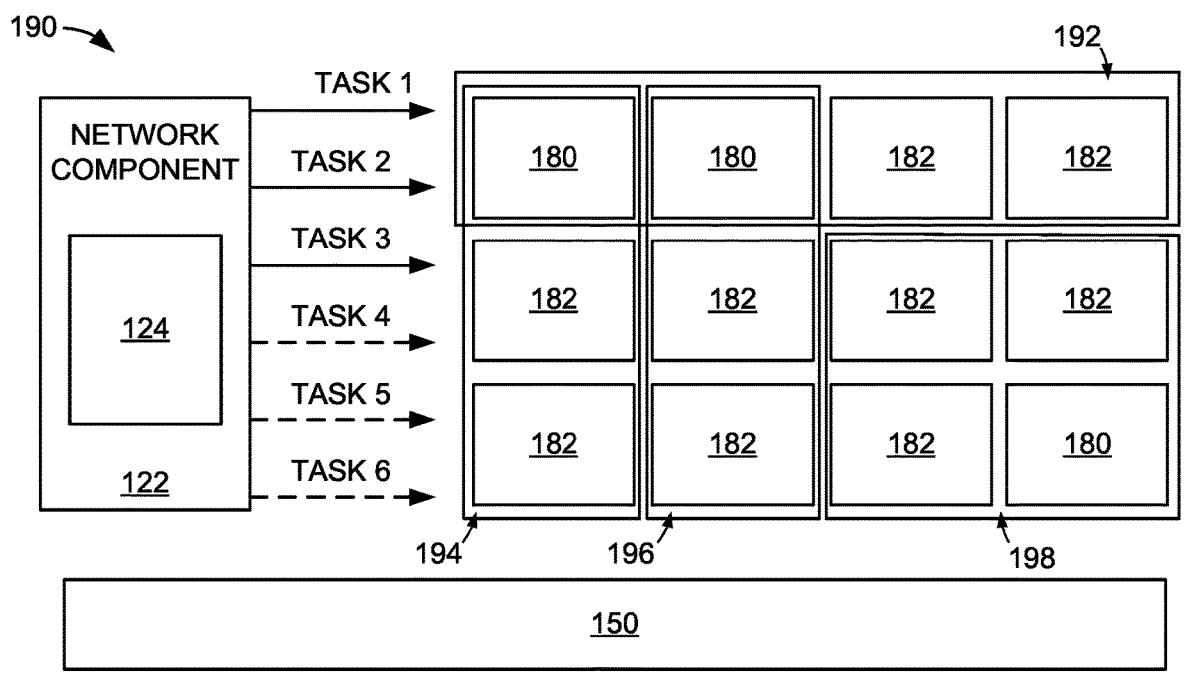
FIG. 6 depicts a block representation of portions of an example data storage system employed in accordance with assorted embodiments.

FIG. 6 depicts a block representation of another example distributed data storage system 190 that employs a performance module 150 to mitigate performance bottlenecks in upstream components 122. The non-limiting example system 190 is configured with multiple concurrent peer groups 192/194/196/198 that respectively have different tasks diverted from the upstream network component 122. It is noted that some peer groups share data storage devices 104, which can provide a diverse variety of task handling capabilities to the performance module 150. In such a shared device configuration, each peer group 192/194/196/198 has a single assigned master device and share slave devices, which allows different master devices to share the slave devices without inducing performance degradation, interruption, or interference.

It is contemplated that the performance module 150 selectively activates the respective peer groups 192/194/196/198 in response to detected, and/or predicted, bottlenecks in network component 122 performance. For instance, the performance module 150 can activate a single peer group 192 in response to a future bottleneck and workload change in the network component 122 before activating additional concurrent peer groups 194/196/198 to handle and complete other tasks diverted from the network component. The ability of the performance module 150 to dynamically assign tasks to peer groups as well as the sequence of peer group activation in response to detected and/or predicted network component 122 performance bottlenecks provides adaptive capabilities that can alleviate different bottleneck conditions over time to reduce network controller 124 processing demand and help maintain consistent performance for data throughput.

Various embodiments construct a peer grouping strategy with the performance module 150 that includes predetermined sequence of tasks assigned to particular peer groups or a sequence of peer groups sequentially organized to complete the first diverted network component task. That is, the performance module 150 can preset a sequence of tasks to be diverted to the first available peer group or preset a sequence of peer groups to complete the first available diverted task. Thus, the performance module 150 can predetermine how processing workloads can be diverted to mitigate performance bottlenecks and maintain system performance despite changing volumes of host-generated data access requests, scheduled system tasks, and/or reactive system tasks.

Figure 7:
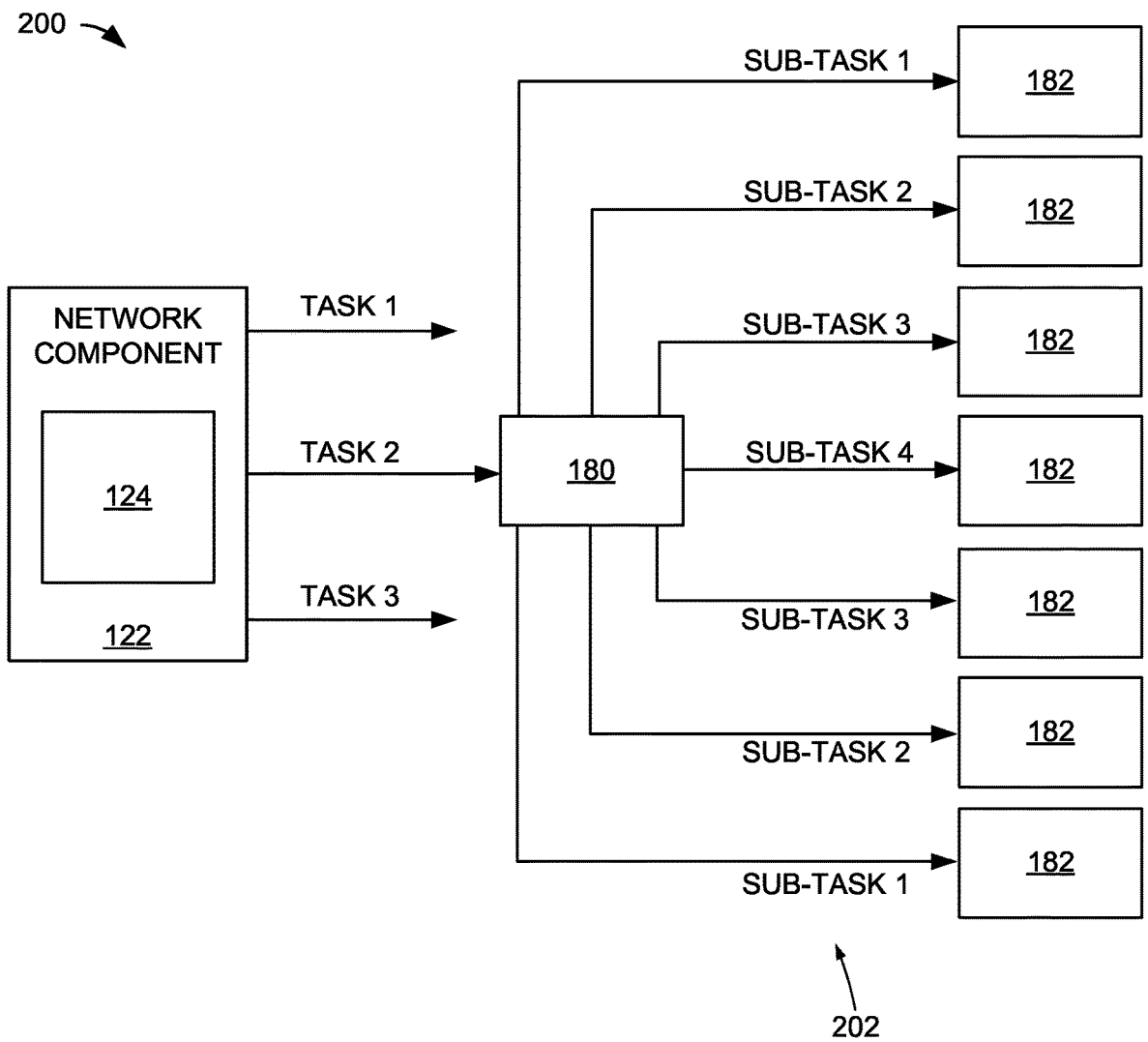
FIG. 7 depicts a block representation of portions of an example data storage system carrying out various embodiments.

FIG. 7 illustrates a block representation of portions of an example distributed data storage system 200 arranged to provide optimal balance of workload tasks to mitigate the presence of performance bottlenecks. Over time, tasks that are normally executed by an upstream network component 122 are identified as posing a bottleneck in performance. Such bottleneck identification is not limited and can consist of increases in queued requests and scheduled system tasks above a predetermined network component processing capability threshold, such as 80% of capacity. Other embodiments of bottleneck identification can involve simply balancing processing of tasks among the network component 122 and downstream peer group 202 to maintain a processing capacity range for the upstream network component 122, such as 0-50%.

The identification of a performance bottleneck triggers the execution of a predetermined peer grouping strategy that assigns one or more tasks previously scheduled for completion by the network component 122 to at least one logical peer group established to concurrently satisfy an assigned task while servicing host-generated data access requests. While not required or limiting, a peer grouping strategy can prescribe a master device of a peer group and one or more slave devices.

The master device 180 can direct operations of both completion of tasks diverted from the upstream network component and host-generated data reads and writes to a memory. Such operations can involve the generation of sub-task commands that direct slave devices 182 to execute a particular aspect of a task and/or access request. By using the local data storage device controllers to generate, schedule, distribute, and execute sub-tasks created by a master device 180 and carried out by slave devices 182, a task diverted from an upstream network component can be efficiently carried out in parallel by downstream data storage devices, which allows the respective data storage devices to satisfy host-generated data access requests and/or other tasks, such as background data operations, without degraded latency, error rate, or other performance. In other words, the intelligent dividing of a task into sub-tasks by a master data storage device 180 corresponds with maintained data access performance metrics despite greater volumes of executed commands.

As a non-limiting example, a master device 180 can evaluate an assigned task and divide the task into a plurality of sub-tasks that collectively accomplish the network component task. It is contemplated that a master device 180 can have predetermined sub-tasks associated with an assigned network component task or generate new sub-tasks in response to a task assignment. A sub-task can be characterized as a processing request to be satisfied to contribute to accomplishing an assigned task. For instance, a master data storage device controller can divide RAID, error correction, data mapping, and security operations into multiple sub-tasks, such as data relocation, data generation, processing of data addresses, and packaging of data, that are distributed to select slave data storage devices for execution. The distribution of sub-tasks may coincide with an assigned execution schedule that is selected so that the collective data storage devices can satisfy host-generated data access requests concurrently with the execution of sub-tasks without degraded performance.

Figure 8:
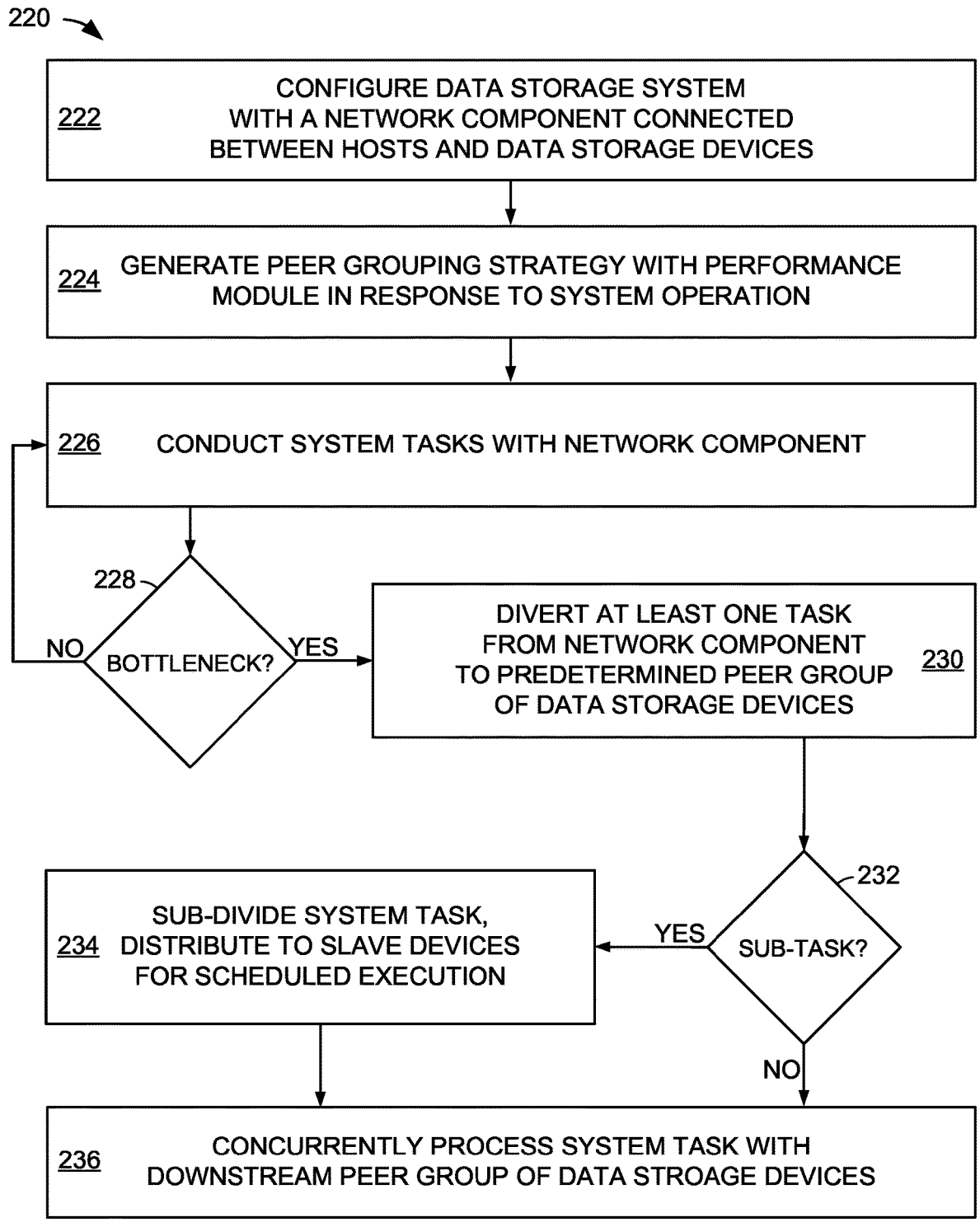
FIG. 8 is a flowchart of an example bottleneck routine the can be executed with the respective data storage systems of FIGS. 1-7 in some embodiments.

FIG. 8 depicts an example performance routine 220 that can be carried out by the assorted embodiments of FIGS. 1-7 to provide optimized bottleneck identification and mitigation. Initially, a distributed data storage system is configured with at least one network component connected between multiple hosts and a data storage repository consisting of multiple separate data storage devices in step 222. A performance module connected to portions of the distributed data storage system translates any number and type of input information into a peer grouping strategy in step 224 that proactively prescribes at least one task of the network component that can be diverted to a logical peer group of downstream data storage devices.

The peer grouping strategy generated in step 224 can prescribe any number and type of actions to prevent, or at least mitigate, a performance bottleneck in an upstream network component. For instance, the peer grouping strategy of step 224 can set which data storage devices are logically grouped, which peer group is assigned a task, which task is diverted from a network component to a peer group, which devices are master devices, and which devices are slave devices. Some embodiments of the peer grouping strategy prescribe operational identifiers that indicate a performance bottleneck is present, imminent, or likely in the future, such as queue volume, computed component workload, available processing capability, changes in performance metrics, pending network activity, or newly connected hosts/devices.

Generation of the peer grouping strategy allows network components to conduct a variety of system tasks in step 226, such as, but not limited to, RAID operations, error correction assignment, data rebuild, device initialization, data security operations, and firmware upgrades. The task execution of step 226 is expected to be conducted solely with upstream network component processing capabilities, such as controllers, microprocessors, and programmable circuitry, prior to resulting data, maps, tables, firmware, and information being moved to permanent destinations in one or more data storage devices. That is, the tasks executed in step 226 are intended to be processed, scheduled, and distributed by upstream network components, which may generate information and data that is subsequently stored in a downstream data storage device.

Any number and type of network component tasks can be completed in step 226 while the performance module evaluates if a performance bottleneck is present, imminent, or reliably forecasted in decision 228. The performance module can continuously, sporadically, or routinely conduct one or more tests, analysis of operational conditions, or comparison of past performance to scheduled activity to determine if a performance bottleneck in a network component meets a trigger set in the peer grouping strategy, which indicates degradation in processing capabilities and/or real-time ability to maintain data access reliability, security, and speed.

A detected, identified, or predicted bottleneck in one or more network components in decision 228 prompts step 230 to divert one or more tasks from the network components to a predetermined peer group of data storage devices. It is noted that a peer group can comprise one or more data storage devices that are assigned a master/slave relationship by the peer grouping strategy. That is, the peer grouping strategy can proactively correlate deviated tasks with particular logical peer groups that have the detected, or predicted, processing capability to complete the deviated task without degraded performance for satisfaction of host-generated data access requests.

The assignment of a task from a network component to a peer group allows the network component to continue servicing system operations by completing tasks. The concurrent processing of system tasks by the assigned peer group and the network components provides an efficient balance of the utilization of system processing capabilities without jeopardizing the ability of downstream data storage devices to satisfy data access requests with maintained data access performance, reliability, and security metrics. It is contemplated that step 230 is conducted to divert multiple different tasks from the network component to one or more logical peer groups for execution.

Some embodiments divert a task, in accordance with a peer grouping strategy, with a set execution time, such as after a predetermined amount of time, in response to an operational trigger, like a processing capacity or queue volume, or after a previous task is completed. The peer grouping strategy can prescribe the concurrent, sequential, or random processing of diverted system tasks by different logical peer groups. A task assigned by the performance module from an upstream network component to a downstream logical peer group may have predetermined execution instructions, such as schedule, distribution, and overall time to completion. However, embodiments can direct a master device of a logical peer group to organize and utilize the respective slave devices of the peer group to execute a task in the most efficient manner.

Decision 232 evaluates an assigned task and determines if sub-tasks are to be generated and assigned to slave devices of the logical peer group. If so, step 234 employs the local controller of the master device to intelligently divide an assigned system task into separate sub-tasks that can be concurrently, or sequentially, processed and completed by the local controller of slave devices. The division of a task into sub-tasks may involve redundantly issuing sub-tasks to different slave devices and cancelling a sub-task in response to completion by another device. The ability to intelligently divide a task into different, or redundant, sub-tasks can balance the processing usage of the logical peer group to allow host-generated data access requests to be satisfied with average, or better, performance metrics, such as error rate, latency, and overall time to satisfaction.

At the conclusion of the generation and distribution of sub-tasks in step 234, or in the event decision 232 determines no sub-tasks are to be generated and distributed, step 236 utilizes the respective local controllers of data storage devices of the peer group to concurrently process the assigned system task along with host-generated data access requests. It is noted that step 236 may process a system task or data access request alone at times prescribed by the performance module while processing both a task and data access request at other times. Hence, the performance module can track, monitor, and evaluate the prescribed satisfaction of diverted tasks over time and make adaptations to assigned peer group, task processing schedule, and master/ slave assignments to ensure data access performance is maintained at, or above, averages, which provides a seamless utilization of peer group processing to upstream hosts.

Through the assorted embodiments of a distributed data storage system, a performance module can optimize network component operation by identifying performance bottlenecks and intelligently diverting system tasks to downstream data storage devices. It is contemplated that the performance module is agnostic with respect to drive/component groupings and, instead, focuses on enabling drives, controllers, nodes to operate as master/slave configurations to carry out any number of activities. Various embodiments are directed to avoid clogging upstream network controllers by identifying the need for activities to be conducted and which master/slave configuration is optimal for current, and predicted future, system load, conditions, and reliability. As a result, activities, such as security, RAID, caching, encryption, error recovery, tiering, and data transformation operations, can be intelligently conducted so that the upstream network controller can focus on completion of prioritized system tasks, such as maintaining root of trust, firmware, and data throughput.

It is to be understood that even though numerous characteristics and advantages of various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A method comprising:
   connecting at least one host to a plurality of data storage devices via a network controller;
   identifying a performance bottleneck through the network controller with a performance module connected to the network controller in response to activity of the data storage devices logged by the network controller;
   assigning a peer group of at least two of the plurality of data storage devices with the performance module in response to the identified performance bottleneck; and
   executing a task assigned by the performance module with the at least two of the plurality of data storage devices, the task chosen to mitigate the performance bottleneck by avoiding involvement of the network controller in the task.

2. The method of claim 1, wherein the task is executed by a controller of a first data storage device of the at least two of the plurality of data storage devices assigned as a master device by the performance module.

3. The method of claim 2, wherein a second data storage device of the at least two of the plurality of data storage devices executes the task with the first data storage device as a slave device assigned by the performance module.

4. The method of claim 2, wherein a third data storage device of the at least two of the plurality of data storage devices executes the task with the first data storage device as a slave device assigned by the performance module.

5. The method of claim 1, wherein the task assigns an error correction code to data from a host prior to being written to a data storage device of the plurality of data storage devices.

6. The method of claim 1, wherein the task rebuilds data with error correction code present in user data stored in a data storage device of the plurality of data storage devices.

7. The method of claim 1, wherein the task creates parity data for redundant array of independent devices storage of data in at least one of the plurality of data storage devices.

8. The method of claim 1, wherein the stripes data for redundant array of independent devices storage of data in at least one of the plurality of data storage devices.

9. The method of claim 1, wherein the task mirrors data for redundant array of independent devices storage of data in at least one of the plurality of data storage devices.

10. A method comprising:
    connecting at least one host to a plurality of data storage devices via a network controller;
    predicting a performance bottleneck through the network controller with a performance module connected to the network controller;
    assigning a peer group of at least two of the plurality of data storage devices with the performance module in response to the predicted performance bottleneck; and
    executing a task assigned by the performance module with the at least two of the plurality of data storage devices chosen by the network controller as either a master device or a slave device, the task conducted by a controller of the master device and chosen to prevent the predicted performance bottleneck by avoiding involvement of the network controller in the task.

11. The method of claim 10, wherein the task is an initialization of a newly connected data storage device.

12. The method of claim 11, wherein the initialization consists of upgrading firmware utilized by the newly connected data storage device.

13. The method of claim 11, wherein the initialization consists of loading boot information into the newly connected data storage device.

14. The method of claim 10, wherein the initialization consists of verifying credentials of the newly connected data storage device.

15. The method of claim 10, wherein the task consists of conducting cryptography on user data.

16. A method comprising:
    connecting at least one host to a plurality of data storage devices via a network controller;
    identifying a performance bottleneck through the network controller with a performance module connected to the network controller in response to activity of the data storage devices logged by the network controller;
    assigning a first peer group of at least two of the plurality of data storage devices and a second peer group of at least two of the plurality of data storage devices with the performance module in response to the identified performance bottleneck; and
    assigning a first task to the first peer group and a second task to the second peer group with the performance module, each task chosen to alter the performance bottleneck by removing activity previously assigned to the network controller.

17. The method of claim 16, wherein the first task and second task are executed concurrently.

18. The method of claim 16, wherein the first peer group consists of data storage devices not assigned to the second peer group.

19. The method of claim 16, wherein the performance module adds a data storage device of the plurality of data storage devices to the first peer group in response to a new performance bottleneck.

20. The method of claim 16, wherein the performance module replaces a data storage device of the plurality of data storage devices to the first peer group in response to a change in the identified performance bottleneck.

\* \* \* \* \*